A. G. FRANCE.
COTTER PIN, LINCH PIN, AND THE LIKE.
APPLICATION FILED AUG. 21, 1919.

1,390,609. Patented Sept. 13, 1921.

Inventor—
Arthur Graham France,
By B. Singer, Atty.

UNITED STATES PATENT OFFICE.

ARTHUR GRAHAM FRANCE, OF LONDON, ENGLAND.

COTTER-PIN, LINCH-PIN, AND THE LIKE.

1,390,609. Specification of Letters Patent. Patented Sept. 13, 1921.

Application filed August 21, 1919. Serial No. 319,035.

*To all whom it may concern:*

Be it known that I, ARTHUR GRAHAM FRANCE, subject of the King of Great Britain, residing at 64 Chancery Lane, London, W. C., England, have invented Improvements in Cotter-Pins, Linch-Pins, and the like, of which the following is a specification.

This invention has for its object to provide an improved and simplified construction of cotter pin, linch pin, or the like comprising one single piece or strip of metal which is free from splitting or slotting out of the tongues or doubling of the stem on itself; but can be readily inserted in place, is secure against accidental removal, and can easily be removed when desired. The improved pin comprises a single piece or strip of metal with one or more humps or curvatures formed by bodily displacing or setting the single shank out of normal plane.

The appended drawing illustrates examples of construction of the improved pin.

In one example shown at Figs. 1 to 4 the pin is formed from wire which is suitably formed into a loop $a$ or other form of head at one end, and at its center portion is curved or humped out of the normal plane, as at $b$. Instead of one considerable arc the middle portion may have more than one arc or hump, but I prefer one single curve of some length and steepness, as at Fig. 3. The pin shown at Fig. 4 differs only in the greater radius of its curved part $b$.

Figure 1:
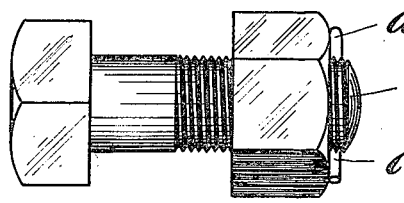
Figure 1 is an elevation of a nut and bolt with the improved pin in place behind the nut.
Figure 2:
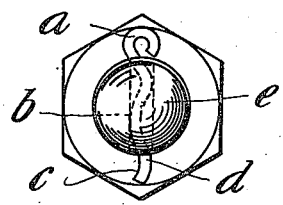
Fig. 2 is a right hand end view of Fig. 1.
Figure 3:
Fig. 3 is an elevation of a pin.
Figure 4:
Fig. 4 shows a slight modification.

I prefer to curve the end of the pin as at $c$ which gives another oppositely directed hump or arc $d$ and another pronounced gripping part which may be spaced so as to come against the outer edge of the hole in the bolt $e$ as shown at Fig. 2. The hole in the bolt may conveniently be twice the diameter of the wire of the pin, or rather less, and the humping or lateral curvature is made so that when the pin is driven through the hole in the bolt the humps are compressed or flattened and exert a considerable grip on the walls of the holes in the bolt.

Figure 5:
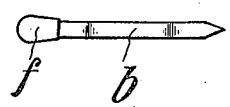
Fig. 5 is a view of a pin made from strip or sheet metal.
Figure 6:
Fig. 6 is a similar view of a pin with a different head or end.
Figure 7:
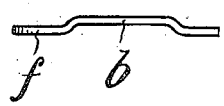
Fig. 7 is an edge view of Fig. 5.

In another example the pin is stamped or pressed from strip or sheet metal with an enlargement or head $f$ at one end (Fig. 5) or, if desired, with an eye $g$ (Fig. 6) of circular or oval form, and between the head and the extremity or point. The main portion may be curved by depressing this part from the normal plane in press tools, stamps, or the like, to form the hump or arc $b$ (Fig. 7). The depressed part may if desired, be straight with curved or inclined portions connecting it with the other part of the pin.

Figure 8:
Fig. 8 is an edge view of a pin similar to Figs. 5 or 6, but with a different head.
Figure 9:
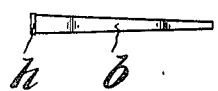
Fig. 9 is a view of a slightly modified form of strip or sheet metal pin.

Instead of a head or loop the strip or pin may be pressed over slightly or hooked at one end as at $h$ Fig. 8, and in any case I may cut out the strip, so that its slide edges are wedge shaped or inclined, converging toward the extremity or points, see Fig. 9.

The pin whether of wire or strip, should be of resisting material so as to possess sufficient stiffness in the hump portion for the purpose of affording the desired grip, as for example, the pins may be of steel tempered after the setting or curving of the shank of the pin.

The improved pin may be most conveniently inserted by tapping it smartly to drive it home when it is secure against accidental removal under vibration or like cause.

I claim:—

1. In combination with a bolt having a transverse opening and a nut on said bolt, a pin in said opening and arranged with its head and tail projecting from opposite sides of the bolt and bearing on the nut, said pin having a shank comprising a single solid undivided strip of metal provided with a hump of a length not greater than the length of the opening in the bolt, said hump being formed by bodily displacing the metal shank out of normal plane, and said opening being of a diameter greater than the thickness or width of the shank of the pin.

2. In combination with a bolt having a transverse opening and a nut on said bolt, a wire pin in said opening, said pin having a looped head and a slightly upturned end bearing on the nut and projecting from opposite sides of the bolt, said pin also having its shank provided with a hump in and engaging opposite sides of the opening in the bolt.

3. In combination with a member having a transverse opening, and an abutment thereon, a wire pin in said opening, said pin having a looped head and a slightly upturned end for bearing against the said abutment and projecting from opposite sides of the member, said pin also having its shank provided with hump in and engaging opposite sides of the opening in the member.

ARTHUR GRAHAM FRANCE.